US006923085B2

(12) United States Patent  (10) Patent No.: US 6,923,085 B2
Nakano                     (45) Date of Patent:     Aug. 2, 2005

(54) SELF-MOVED ROBOT

(75) Inventor: Tomoaki Nakano, Oobu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/094,204

(22) Filed: Mar. 8, 2002

(65) Prior Publication Data

US 2002/0129673 A1 Sep. 19, 2002

(30) Foreign Application Priority Data

Mar. 13, 2001 (JP) ......................................... 2001-070659

(51) Int. Cl.$^7$ ............................................. B65B 69/00
(52) U.S. Cl. ................... 74/490.09; 74/490.01; 74/490.07; 74/490.08; 901/16; 901/47
(58) Field of Search .................. 901/16, 47; 74/490.01, 74/490.07, 490.08, 490.09

(56) References Cited

U.S. PATENT DOCUMENTS 4,409,860 A  * 10/1983 Moriyama et al. ....... 74/490.09
5,340,263 A  *  8/1994 Neri et al. .................. 414/412

FOREIGN PATENT DOCUMENTS

| EP | 0 441 735 | 8/1991 |
| EP | 0 546 592 | 6/1993 |
| GB | 2325915   | 12/1998 |
| JP | 62-48038  | 3/1987 |
| JP | 4-8735    | 1/1992 |
| JP | 8-290350  | 11/1996 |

* cited by examiner

Primary Examiner—David A. Bucci
Assistant Examiner—Bradley J. Van Pelt
(74) Attorney, Agent, or Firm—Harness, Dickey & Pierce, PLC

(57) ABSTRACT

A robotic portion 1 has X-axis, Y-axis and Z-axis modules 2, 3, 4 and can move in three axial directions. This robotic portion 1 is mounted in such a manner as to move on a second base 10 in the X-axis direction. Furthermore, the second base is mounted in such a manner as to move on a first base 12 in the Y-axis direction. Then, the robotic portion 1 can be moved on either the first or second base 12, 10 on pins 7, 8 provided on the Z-axis module 4 which act as fulcrums by moving the robotic portion 1 in the Y-axis direction or the X-axis direction with the pins 7, 8 being inserted into hole portions 14, 11 formed in the first or second base 12, 10.

9 Claims, 3 Drawing Sheets

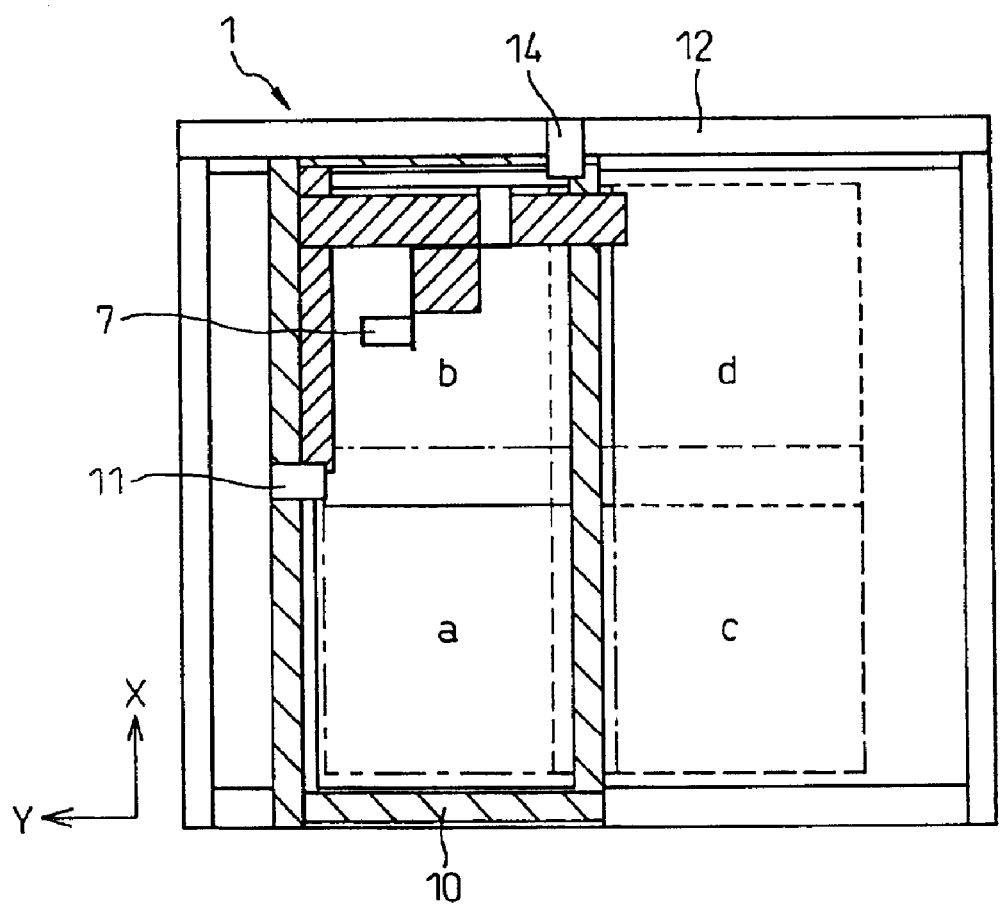

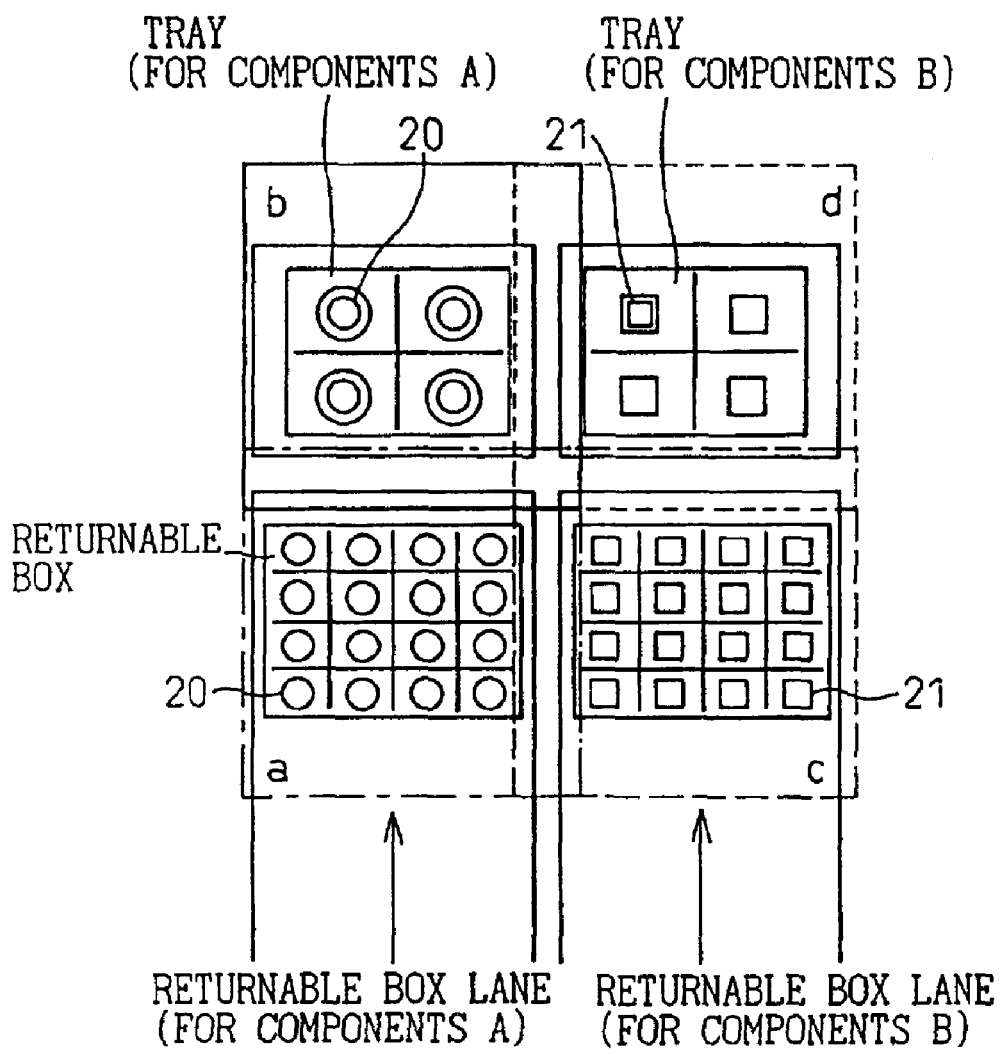

SELF-MOVED ROBOT

BACKGROUND OF THE INVENTION

1. Field of the Invention

The present invention relates to a self-moved robotic apparatus which can move itself to cover a whole working area even if the working area is wider than the movable range of a robot.

2. Description of the Related Art

Described in, for example, Japanese Unexamined Patent Publication (Kokai) No. 62-48038, as a conventional self-propelled robotic apparatus, is a robotic apparatus in which a drive motor for propelling a robot is installed therein, whereby the robot is moved when the drive motor is actuated. Namely, two straight guide rails are fixed to a base, and the robot is placed on the guide rails via bearings in such a manner as to run on the guide rails. Then, a pinion is provided on an output shaft of the drive motor of the robot for mesh engagement with a rack which is fixed on the base, whereby the robot is allowed to run on the guide rails when the drive motor is actuated.

In addition, described in Japanese Unexamined Patent Publication (Kokai) No. 8-290350, as another example of a robotic apparatus which can move itself, is a robotic apparatus in which a robot main body comprising robot arms, processing tools and measuring equipment is placed on a running bogie, so that the robotic apparatus can be moved along a plurality of processing and inspecting facilities.

However, in the former prior art, as the drive motor needs to be provided for propelling the robotic apparatus itself, there are caused problems that production cost is increased and that the strength and rigidity of the base portion must be increased to meet the increase in weight.

In addition, in the latter prior art, there are caused problems that production cost is increased by the use of the running bogie and that space needs to be secured for a passageway along which the running bogie runs.

SUMMARY OF THE INVENTION

The invention was made in view of the problems which are inherent in the prior art and an object thereof is to provide a self-moved robotic apparatus which can move to cover a whole working area, without using a drive motor and a running bogie which are provided exclusively for moving itself, even if the working area is wider than the movable range of a robot.

According to an aspect of the invention, there is provided a self-moved robotic apparatus having a robotic portion having in turn a movable portion and a base on which the robotic portion is placed in such a manner that the robotic portion is allowed to be moved in predetermined directions wherein, in a state in which the movable portion of the robotic portion is in engagement with part of the base, the movable portion is actuated so as to press the base, which is in engagement with the movable portion, in predetermined directions, whereby the robotic portion runs on the base in opposite directions to the directions in which the robotic portion is pressed.

According to the above construction, as the robotic portion is allowed to run on the base by making use of the movable portion which the robotic portion possesses inherently, no drive motor is needed for running the robotic portion, whereby the construction of the robotic apparatus can be simplified and an increase in weight of the robotic portion can be prevented. Then, even if the working area of the robotic apparatus is wider than the movable range of the movable portion in the robotic portion, work can be performed in the whole working area by moving the robotic portion as described above.

In addition, the robotic portion has a base portion (X-axis module) which is provided so as to be allowed to move on the base, and the movable portion is allowed to move relative to the base portion. According to this construction, in a state in which the movable portion is in engagement with the base, the base portion is allowed to move on the base by actuating the movable portion so as to be allowed to move relative to the base portion.

Preferably, the self-moved robotic apparatus according to the invention is provided with a locking mechanism for fixedly holding the robotic portion to the base when the robotic portion performs predetermined work. According to this construction, when the robotic portion performs predetermined work, the robotic portion can be stably fixed onto the base. Note that this locking mechanism is released when the robotic portion runs on the base.

According to another aspect of the invention, there is provided a self-moved robotic apparatus having a first base, a second base mounted on the first base and adapted to move on the first base in a Y-axis direction, a robot base portion mounted on the second base and adapted to move in an X-axis direction which intersects at right angles with the Y-axis direction, a first robot movable portion adapted to move on the robot base portion in the X-axis direction and a second robot movable portion adapted to move on the first robot movable portion in the Y-axis direction and provided with an engagement portion adapted to engage with either the first base or the second base.

In the self-moved robotic apparatus constructed as described above, in a case where the robot base portion is moved in the Y-axis direction, in a state in which the engagement portion of the second robot movable portion is in engagement with the first base, the robot base portion is allowed to move together with the second base on the first base in the Y-axis direction by driving the second robot movable portion so as to move on the first robot movable portion in the Y-axis direction. In addition, in a case where the robot base portion is allowed to move in the X-axis direction, in a state in which the engagement portion of the second robot movable portion is in engagement with the second base, the robot base portion is allowed to move on the second base in the X-axis direction by driving the first robot movable portion so as to move on the robot base portion in the X-axis direction.

Thus, due to the use of the first base and the second base, the movable range of the robotic apparatus can be extended in a second dimensional fashion.

Preferably, the self-moved robotic apparatus according to the invention has a movable portion which can move in a Z-axis direction which intersects at right angles with both the X-axis direction and the Y-axis direction. Various types of work can be implemented by providing this movable portion of the second robot movable portion in such a manner as to move vertically, as a robot hand.

Preferably, the self-moved robotic apparatus according to the invention comprises further a first locking mechanism for fixing the second base to the first base and a second locking mechanism for fixing the robot base portion to the second base. According to this construction, when the robot performs predetermined work, the robot can stably be fixed onto the first base with these first and second locking mechanisms.

The present invention may be more fully understood from the description of the preferred embodiments of the invention, as set forth below, together with the accompanying drawings.

BRIEF DESCRIPTION OF THE DRAWINGS

In the drawings;

FIG. 2 is a diagram showing working areas of a robotic portion, and FIG. 3 is a diagram explaining transfer work carried out by the automotive components transferring apparatus.

DESCRIPTION OF THE PREFERRED EMBODIMENTS

Figure 1:
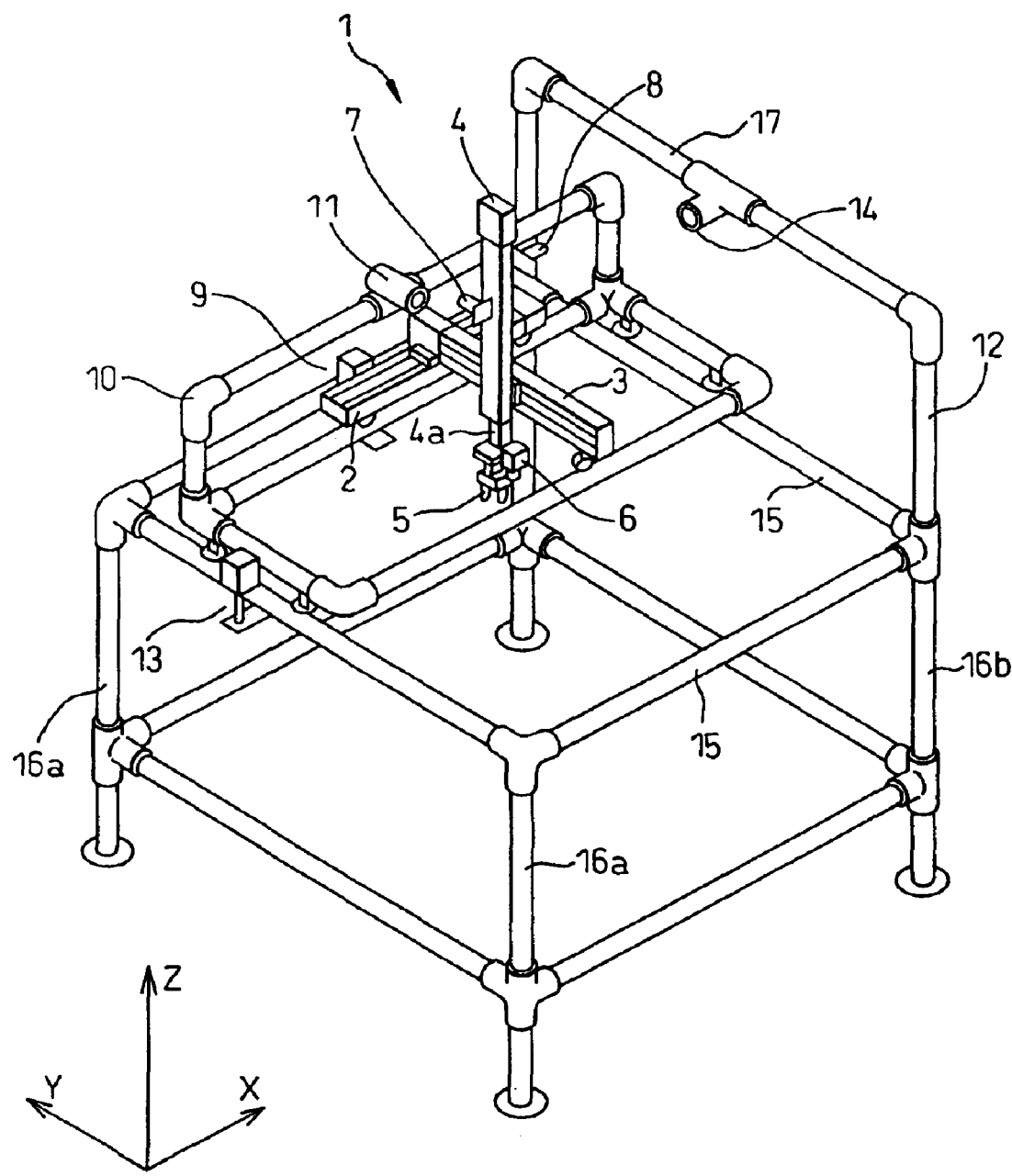
FIG. 1 is a perspective view showing the construction of an automotive components transferring apparatus according to an embodiment of the invention.

Embodiments of the invention will be described below based on the accompanying drawings.

In the embodiments of the invention, an example will be described in which the self-moved robotic apparatus is applied to an automotive components transferring apparatus for performing the transfer work of transferring components from returnable boxes to component trays.

FIG. 1 shows the overall construction of an automotive components transferring apparatus. In FIG. 1, a robotic portion 1 is constituted by an X-axis module 2, a Y-axis module 3 and a Z-axis module 4. The X-axis module 2 corresponds to a base portion of the present invention. An end of the Y-axis module 3 is brought into engagement with the X-axis module 2 and is driven by, for example, a servo motor incorporated in the X-axis module 2 so as to be allowed to move in an X-axis direction. The Z-axis module 4 is mounted on the Y-axis module 3. Then, the Z-axis module 4 is driven by a servo motor incorporated in the Y-axis module 3 so as to be allowed to move to an optional position on the Y-axis module 3 in a Y-axis direction. Furthermore, a moving portion 4a is provided on a lower side of the Z-axis module 4 which is adapted to move vertically in a Z-axis direction relative to a Z-axis module main body (an outer tube). This moving portion 4a is actuated by a servo motor incorporated in the Z-axis module 4 so as to be allowed to move vertically in the Z-axis direction. Note that the power source for moving the Y-axis module 3 and the Z-axis module 4 is not limited to the servo motors but, for example, pneumatic or hydraulic means may be adopted in lieu of the servo motors.

A hand 5 is provided at a lower distal end of the moving portion 4a of the Z-axis module 4, and chuck jaws of this hand 5 are opened and closed pneumatically to grip with the chuck jaws and release from the chuck jaws a component. In addition, a camera 6 is equipped at a lower distal end of the moving portion 4a. Signals from this camera 6 are sent to a control device, not shown. The control device adjusts the positions of the Y-axis module 3 and the Z-axis module 4 based on an image signal from the camera 6 such that the hand 5 grips a predetermined position of a component, and thereafter controls the hand 5 to act in such a manner that the hand 5 grips the component. Furthermore, temporary fixing pins 7, 8 are provided on an upper portion of the Z-axis module 4, these temporary fixing pins 7, 8 being described later.

The robotic portion 1, constructed as has been described above, is mounted on a second base 10. Pulleys are provided on a mounting side of the robotic portion 1 which is mounted on the second base 10, that is to say, lower sides of the X-axis module 2 and the Y-axis module 3, so that the robotic portion 1 is allowed to move on the second base 10 in the X-axis direction as a whole. Furthermore, pulleys are also provided on a lower side of the second base 10, and the pulleys are mounted on a first base 12, so that the second base 10 is allowed to move on the first base 12 in the Y-axis direction.

As shown in FIG. 2, the first base 12 is constituted by rails 15 which are connected to each other to form a square-like shape in such a manner as to surround working areas a to d of the robotic portion 1 and is supported with four posts 16a, 16b in such a manner as to connect the four posts 16a, 16b to each other to thereby secure the strength of the first base 12. The longer posts 16b of the four posts 16a, 16b extend upwardly further than a supporting position of the rails 15 which are connected to each other in the square-like shape and ends of the longer posts 16b so extending are connected by the rail 17 to each other. A hole 14 is provided at a substantially central position of the rail 17 for engagement with the temporary fixing pin 8.

Two rails of the second base 10 extending in the x-axis direction of the second base 10 has a length which is substantially equal to the length of two rails thereof which extend in the X-axis direction of the first base. Then, pulleys are mounted on lower sides of two rails of the second base 10 which extend in the Y-axis direction, whereby the second base 10 is allowed to move on the first base in the Y-axis direction.

In addition, the length of two rails of the second base 10 which extend in the Y-axis direction is substantially equal to the length of the robotic portion 1 in the Y-axis direction. Then, pulleys are provided on lower sides of the X-axis module 2 and the Y-axis module 3 of the robotic portion 1, and the robotic portion 1 is mounted on the second base 10 in such a manner that the pulleys so provided are allowed to move on the two rails of the second base which extend in the X-axis direction, whereby the robotic portion 1 is allowed to move on the second base 10 in the X-axis direction.

Furthermore, as in the case with the first base 12, there are two posts provided on the second base 10 which extend upwardly from both ends of one of the rails which are connected to each other in a square-like shape, and there is also provided a rail which is adapted to connect distal ends of the two posts. In addition, a hole portion 11 is provided at a substantially central position of the rail for engagement with the temporary fixing pin 7.

Locking mechanisms 9, 13 are provided on the X-axis module 2 of the robotic portion 1 and the rail of the second base which extends in the Y-axis direction, respectively. These locking mechanisms 9, 13 fix the robotic portion 1 to the second base 10 and the second base 10 to the first base 12, respectively, so that the movement of the robotic portion 1 is prevented when the robotic portion 1 grips and releases components. Each of the locking mechanisms 9, 13 comprises an air cylinder and a plate, and the air cylinder is actuated when it receives a drive signal from the control device, not shown, and presses the plate against the rail from below the rail for locking.

Described next will be a moving process of the robotic portion 1 within its working areas in conjunction with transferring work of the automotive components transferring apparatus in which automotive components are transferred accordingly.

As shown in FIG. 3, the automotive components transferring apparatus according to the invention is designed to transfer components A 20 and components B 21 from a returnable box containing components A 20 and a returnable box containing components B 21, respectively, to a tray, which returnable boxes are supplied to two returnable box introduction lanes, respectively. Due to this, the robotic portion 1 has four working areas; a working area (a) for picking up components A 20, a working area (b) for placing the components A 20 so picked up onto the tray, a working area (c) for picking up components B 21, and a working area (d) for placing the components B 21 so picked up on the tray. In contrast, while the movable range of the robotic portion 1 is set substantially to cover the individual working areas (a) to (d), the robotic portion 1 needs to move between the four working areas (a) to (d) to implement the transfer work of the components as described above. To describe this transfer work simply, firstly a component A 20 is taken out of the returnable box in the working area (a), and the robotic portion 1 is moved to the working area (b) so as to set the component A 20 on the tray. Then, the robotic portion 1 returns to the working area (a), and after another component A 20 is taken out, the robotic portion 1 moves to the working area (b) so that the component A 20 so taken out is set on the tray. After a required number of components A 20 have been set on the tray, then next the transfer of components B 21 is started. Namely, the robotic portion 1 together with the second base 10 is moved to the working areas (c), (d), so that a component B 21 is taken out in the working area (c), so that the component B 21 so taken out is set on the tray in the working area (d). After this work is repeated in a required number of times, and the robotic portion 1 returns to the working area (a) for working with components A 21.

Firstly, a moving process of the robotic portion from the working area (a) to the working area (b) will be described. In a case where work (of picking out a component A 20 from the returnable box) is performed in the working area (a), the location of the robotic portion 1 needs to be fixed so that the robotic portion 1 does not move. To make this happen, the control device actuates the locking mechanisms 9, 13 to fix the X-axis module 2 to the second base 10, and the second base 10 to the first base 12, respectively.

When work in the working area (a) is completed, the control device moves the Y-axis module 3 and the Z-axis module 4 in the X-axis direction and the Y-axis direction, respectively, so that the temporary fixing pin 7 provided on the Z-axis module 4 is inserted into the hole portion 11 provided on the second base 10.

When the temporary fixing pin 7 is inserted into the hole portion 11, the control device releases the locking mechanism 9. With the locking mechanism 9 being released, the robotic portion 1 is connected to the second base 10 only with the temporary fixing pin 7. Due to this, when a servo motor of the X-axis module 2 is actuated so that the Y-axis module 3 of the robotic portion 1 moves from the working area (b) to the working area (a) in the X-axis direction, the X-axis module 2 moves from the working area (a) toward the working area (b) in the X-axis direction because the Y-axis module 3 is restrained in the X-axis direction by the temporary fixing pin 7.

When the robotic portion 1 (the X-axis module 2) moves as far as a position in the working area (b) where the robotic portion 1 can start required work, the control device again fixes the robotic portion 1 and the second base 10 with the locking mechanism 9 and pulls the temporary fixing pin 7 out of the hole portion 11, whereby the robotic portion 1 is allowed to work in the working area (b).

In addition, when the robotic portion is moved to the working area (b), the traveling amount of the X-axis module 2 is calculated from a drive signal of the servo motor, and when this traveling amount reaches a predetermined value, the drive of the motor may be halted, or alternatively, the camera 6 provided on the Z-axis module 4 may be used to confirm a position to which the robotic portion 1 is moved so as to position the location of the X-axis module 2 after the robotic portion is so moved.

Next, a moving process of the robotic portion from the working area (b) to the working area (d) will be described.

When work in the working area (b) is completed, the control device moves the Y-axis module 3 and the Z-axis module 4 in the X-axis direction and the Y-axis direction, respectively, so that the temporary fixing pin 8 provided on the Z-axis module 4 is inserted into a hole portion 14 formed in the first base 12. When the temporary fixing pin 8 is inserted into the hole portion 14 in this way, the control device releases the locking mechanism 13. With the locking mechanism 13 being released, the robotic portion 1 and the second base 10 are connected to the first base 12 only with the temporary fixing pin 8. Note that, as this occurs, the robotic portion 1 and the second base 10 are fixed to each other by the locking mechanism 9.

Due to this, when the servo motor on the second base 10 is actuated in such a manner that the Z-axis module 4 of the robotic portion 1 moves from the working area (d) toward the working area (b) in the Y-axis direction, as the Z-axis module 4 is restrained with the temporary fixing pin 8 with respect to the Y-axis direction, the Y-axis module 3 and hence the second base 10 move from the working area (b) toward the working area (d) in the Y-axis direction.

When the robotic portion 1 and the second base 10 move to a position where they can start to work in the working area (d), the control device again fixes the second base 10 and the first base 12 with the locking mechanism 13 and pulls the temporary fixing pin 8 out of the hole portion 14, whereby the robotic portion is allowed to work in the working area (d). However, in real transfer work, since a component B 21 needs to be first picked up in the working area (c), the robotic portion 1 continues to be moved further from the working area (d) to the working area (c) due to the same moving process as that in the aforesaid X-axis direction.

In the aforesaid automotive components transferring apparatus, while the robotic portion 1 has been described as being moved among the four working areas (a) to (d), the number of working areas may be optionally increased or decreased as required.

For example, in case there are two working areas, the first base 12 is not needed, and the robotic portion 1 may only have to be moved on the second base 10.

In addition, in case the number of working areas is increased to more than four, a hole portion for engagement with the temporary fixing pins 7, 8 which are provided on the Z-axis module may be formed in the first base 12 or the second base 10 for each working area, whereby any number of working areas may be set in the X-axis direction and the Y-axis direction.

According to this automotive components transferring apparatus, as the robotic portion can be made small relative to the working areas, the apparatus is advantageous in reducing the production costs and weight thereof. In addition, since the weight of the robotic portion can be reduced, the specification requirements for the strength and rigidity of the base can be relaxed. This also help reduce the production cost. Furthermore, since a motor that is to be provided exclusively for moving the robotic portion 1 does not have to be provided, the construction of the robotic portion 1 can be simplified, and the control configuration of thereof can also be simplified.

While the invention has been described by reference to specific embodiments chosen for purposes of illustration, it should be apparent that numerous modification could be made thereto by those skilled in the art without departing from the basic concept and scope of the invention.

What is claimed is:

1. A self-moved robotic apparatus comprising:
   a first base;
   a second base mounted on said first base and adapted to move on said first base in a Y-axis direction;
   a robot base portion mounted on said second base and adapted to move in an X-axis direction which intersects at right angles with the Y-axis direction;
   a first robot movable portion adapted to move on said robot base portion in the X-axis direction; and
   a second robot movable portion adapted to move on said first robot movable portion in the Y-axis direction, said second robot movable portion having an engagement portion adapted to engage with either said first base or said second base, wherein:
   when said robot base portion is moved in the Y-axis direction and said engagement portion of said second robot movable portion is in engagement with said first base, said robot base portion moves together with said second base on said first base in the Y-axis direction by driving said second robot movable portion; and
   when said robot base portion is allowed to move in the X-axis direction and said engagement portion of said second robot movable portion is in engagement with said second base, said robot base portion moves on said second base in the x-axis direction by driving said first robot movable portion.

2. A self-moved robotic apparatus, as set forth in claim 1, wherein said second robot movable portion has a movable portion which can move in a Z-axis direction which intersects at right angles with both the X-axis direction and the Y-axis direction.

3. A self-moved robotic apparatus as set forth in claim 2, further comprising a first locking mechanism for fixing said second base to said first base and a second locking mechanism for fixing said robot base portion to said second base.

4. A self-moved robotic apparatus as set forth in claim 1, further comprising a first locking mechanism for fixing said second base to said first base and a second locking mechanism for fixing said robot base portion to said second base.

5. A self movable robotic apparatus comprising:
   a base (12, 10);
   a robot base portion (2) mounted on the base in a manner that the robot base portion (2) is movable in an X-axis direction;
   a robotic portion having a robotic movable portion (3, 4, 4a) mounted on the robot base portion and an objective portion (5, 6) which is moved in the X-axis direction and a Y-axis direction with respect to the robot base portion (2) by driving the robotic movable portion;
   an X-axis locking mechanism (9) which holds the robot base portion (2) on the base (12, 10) with respect to the X-direction, when the robotic movable portion (3, 4, 4a) is driven to move the objective portion (5, 6) within a movable area which is associated with an X-axis location of the robot base portion (2) on the base (12, 10), and
   an X-axis engagement mechanism (7, 11) which holds the robotic movable portion (3, 4, 4a) on the base (12, 10) with respect to the X-direction, when the X-axis locking mechanism (9) is released and the robotic movable portion (3, 4, 4a) is driven to move the robot base portion (2) in the X-axis direction so as to change the X-axis location of the robot base portion (2) and the movable area of the objective portion (5, 6); wherein
   a movable range of the robotic movable portion (3, 4, 4a) in the X-axis direction on the base (12, 10) is longer than a movable range of the robotic movable (3, 4, 4a) in the X-axis direction on the robot base potion (2), due to the movement of the robot base portion in the X-axis direction by means of the robotic movable portion (3, 4, 4a).

6. The self-movable robotic apparatus claimed in claim 5, wherein the objective portion (5, 6) includes a hand mechanism (5).

7. The self-movable robotic apparatus claimed in claim 5, wherein the objective portion (5, 6) is moved in the X-axis, the Y-axis and a Z-axis directions with respect to the robot base portion (2) by driving the robotic movable portion.

8. The self-movable robotic apparatus claimed in claim 5, wherein the base includes a first base (12) and a second base (10) mounted on the first base in a manner that the second base (10) is movable in the Y-direction.

9. The self-movable robotic apparatus claimed in claim 8, further comprising:
   a Y-axis locking mechanism (13) which holds the second base (10) on the first base (12) with respect to the Y-direction, when the robotic movable portion (3, 4, 4a) is driven to move the objective portion (5, 6) within the movable area which is associated with a Y-axis location of the second base (10) on the first base (12); and
   a Y-axis engagement mechanism (8, 14) which holds the robotic movable portion (3, 4, 4a) on the first base (12) with respect to the Y-direction, when the Y-axis locking mechanism (13) is released and the robotic movable portion (3, 4, 4a) is driven to move the second base (10) in the Y-axis direction so as to change the Y-axis location of the robot base portion (2) and the movable area of the objective portion (5, 6).

* * * * *

UNITED STATES PATENT AND TRADEMARK OFFICE
CERTIFICATE OF CORRECTION

PATENT NO. : 6,923,085 B2
DATED : August 2, 2005
INVENTOR(S) : Tomoaki Nakano

It is certified that error appears in the above-identified patent and that said Letters Patent is hereby corrected as shown below:

<u>Column 8,</u>
Line 23, after "movable" insert -- portion --.
Line 24, "potion" should be -- portion --.

Signed and Sealed this

Twenty-eighth Day of March, 2006

JON W. DUDAS
*Director of the United States Patent and Trademark Office*